United States Patent
Zhu (10) Patent No.: US 9,278,719 B2
(45) Date of Patent: Mar. 8, 2016

(54) VEHICLE

(71) Applicant: Xiaoyi Zhu, Shenzhen (CN)

(72) Inventor: Xiaoyi Zhu, Shenzhen (CN)

(*) Notice: Subject to any disclaimer, the term of this patent is extended or adjusted under 35 U.S.C. 154(b) by 0 days.

(21) Appl. No.: 14/176,141

(22) Filed: Feb. 9, 2014

(65) Prior Publication Data

US 2014/0152050 A1    Jun. 5, 2014

Related U.S. Application Data

(60) Continuation-in-part of application No. 13/786,413, filed on Mar. 5, 2013, now Pat. No. 8,684,446, which is a division of application No. 13/335,913, filed on Dec. 22, 2011, now Pat. No. 8,408,635, which is a division of application No. 12/559,543, filed on Sep. 15, 2009, now Pat. No. 8,113,569, which is a continuation-in-part of application No. PCT/CN2008/073367, filed on Dec. 8, 2008.

(30) Foreign Application Priority Data

| Dec. 27, 2007 | (CN) | 2007 1 0186155 |
|---|---|---|
| Dec. 27, 2007 | (CN) | 2007 1 0186156 |
| Jan. 7, 2008 | (CN) | 2008 1 0000302 |
| Feb. 13, 2008 | (CN) | 2008 1 0008130 |
| Jul. 11, 2008 | (CN) | 2008 1 0068379 |

(51) Int. Cl.
*B62D 35/00* (2006.01)
*B62D 35/02* (2006.01)

(52) U.S. Cl.
CPC .............. *B62D 35/00* (2013.01); *B62D 35/001* (2013.01); *B62D 35/02* (2013.01); *Y02T 70/121* (2013.01)

(58) Field of Classification Search
CPC ....... B62D 35/00; B62D 35/02; B62D 35/001
USPC .............. 180/903, 7.1, 2.2; 296/180.1, 181.5, 296/208; 244/12.1, 17.11, 12.2, 209
See application file for complete search history.

(56) References Cited

U.S. PATENT DOCUMENTS

| 3,791,468 | A * | 2/1974 | Bryan, Jr. | 180/69.2 |
|---|---|---|---|---|
| 4,460,055 | A * | 7/1984 | Steiner | 180/7.1 |
| 5,280,827 | A * | 1/1994 | Taylor et al. | 180/165 |
| 5,842,734 | A * | 12/1998 | Lechner | 296/180.1 |
| 6,685,256 | B1 * | 2/2004 | Shermer | 296/180.4 |
| 7,152,908 | B2 * | 12/2006 | Shahbazi | 296/180.1 |

* cited by examiner

*Primary Examiner* — Glenn Dayoan
*Assistant Examiner* — Sunsurraye Westbrook
(74) *Attorney, Agent, or Firm* — Matthias Scholl, PC; Matthias Scholl (57) ABSTRACT

A vehicle including a housing. The housing includes an outer portion, an inner portion, an air-flow channel, a plurality of air inlets, an air outlet, and a spoiler surface or a spoiler. The air-flow channel is disposed between the outer portion and the inner portion of the housing. The air inlets are disposed on the outer portion of the housing, and the air outlet is disposed at a rear of the outer portion of the housing. The air-flow channel communicates with the air inlets and the air outlet. The spoiler surface or the spoiler is disposed on a bottom of the outer portion of the housing, a top of the inner portion of the housing, or both the bottom of the outer portion and the top of the inner portion of the housing, for extending path of the air.

14 Claims, 6 Drawing Sheets

VEHICLE

CROSS-REFERENCE TO RELATED APPLICATIONS

This application is a continuation-in-part of U.S. application Ser. No. 13/786,413 filed Mar. 5, 2013, now pending, which is a divisional of U.S. Ser. No. 13/335,913 filed on Dec. 22, 2011, issued as U.S. Pat. No. 8,408,635 on Apr. 2, 2013, which is a divisional of U.S. Ser. No. 12/559,543 filed on Sep. 15, 2009, issued as U.S. Pat. No. 8,113,569 on Feb. 14, 2012, which is a continuation in part of International Patent Application No. PCT/CN2008/073367, with an international filing date of Dec. 8, 2008, designating the United States. This application also claims foreign priority benefits to Chinese Patent Application No. 200710186155.9, filed Dec. 27, 2007, Chinese Patent Application No. 200710186156.3, filed Dec. 27, 2007, Chinese Patent Application No. 200810000302.3, filed Jan. 7, 2008, Chinese Patent Application No. 200810008130.4, filed Feb. 13, 2008, and Chinese Patent Application No. 200810068379.4, filed Jul. 11, 2008. The contents of all of these specifications are incorporated herein by reference. Inquiries from the public to applicants or assignees concerning this document or the related applications should be directed to: Matthias Scholl P.C., Attn.: Dr. Matthias Scholl Esq., 14781 Memorial Drive, Suite 1319, Houston, Tex. 77079.

BACKGROUND OF THE INVENTION

1. Field of the Invention

The invention relates to a vehicle, and more particularly to an energy-saving vehicle.

2. Description of the Related Art

During the travel of conventional vehicles, a lifting force is produced because the air-flow path on the upper portion is longer than the air-flow path on the lower portion, and thus, the tire-road adhesion is decreased, resulting in an unstable travelling of the vehicles. To solve the problem, a typical method is to increase the weight of the vehicle to overcome the lifting force. However, this method leads to a large amount of energy waste.

SUMMARY OF THE INVENTION

In view of the above-described problems, it is one objective of the invention to provide an energy-saving vehicle.

To achieve the above objective, in accordance with one embodiment of the invention, there is provided a vehicle that comprises a housing. The housing comprises an outer portion, an inner portion, an air-flow channel, a plurality of air inlets, an air outlet, and a spoiler surface or a spoiler. The air-flow channel is disposed between the outer portion and the inner portion of the housing. The air inlets are disposed on the outer portion of the housing, and the air outlet is disposed at a rear of the outer portion of the housing. The air-flow channel communicates with the air inlets and the air outlet. The spoiler surface or the spoiler is disposed on a bottom of the outer portion of the housing, a top of the inner portion of the housing, or both the bottom of the outer portion and the top of the inner portion of the housing, for extending path of the air, whereby producing lifting force of the inner portion of the housing and eliminating lifting force of the outer portion of the housing during the travelling of the vehicle.

In a class of this embodiment, the vehicle comprises a plurality of magnetic devices and elastic devices. The outer portion and the inner portion of the housing are connected via the elastic devices. The magnetic devices having opposite polarities are disposed on a contact surface between the elastic devices and the inner portion of the housing.

In a class of this embodiment, the spoiler surface or the surface of the spoiler adopts a shape selected from the group consisting of a concave-convex arc, a triangle, or a trapezoid for extending the path of the air. The spoiler surface is an integral structure and the spoiler is an independent structure.

In a class of this embodiment, the spoiler surface or the spoiler forms a water wave surface being symmetrical or asymmetrical in a longitudinal direction or being symmetrical or asymmetrical in both the longitudinal direction and a transverse direction, respectively.

In a class of this embodiment, the inner portion of the housing comprises a plurality of independent carrying spaces.

In a class of this embodiment, the outer portion of the housing comprises a plurality of spoilers comprising a curved outer surface and a flat inner surface, and the spoilers cover a partial or the whole inner portion of the housing. A pressure port is formed between two adjacent spoilers. The pressure port communicates with the air-flow channel disposed between the spoilers and the inner portion of the housing.

In a class of this embodiment, the spoiler or the spoiler surface comprises a cavity. A plurality of pressure ports are arranged on the outer surface of the spoiler or the spoiler surface. The pressure ports communicate with the cavity.

In accordance with another embodiment of the invention, there is provided a vehicle comprising a housing. The housing comprising an upper portion, a bottom, and an air-flow channel. The air-flow channel is disposed between the upper portion and the bottom of the housing and communicates with the atmosphere. A lower surface of the bottom of the housing and/or the upper surface of the upper portion of the housing are provided with spoiler or spoiler surface for extending path of the air, whereby producing lifting force of the upper portion of the housing and eliminating lifting force of the bottom of the housing during the travelling of the vehicle.

In a class of this embodiment, a plurality of elastic devices are disposed between the upper portion of the housing and the bottom of the housing. Magnetic devices having opposite polarities are disposed on a contact surface between the elastic devices and the upper portion of the housing and a contact surface between the elastic devices and the bottom of the housing, or disposed between the upper portion of the housing and the bottom of the housing.

In a class of this embodiment, a partial or the whole housing is covered with a plurality of the spoiler comprising a curved outer surface and a flat inner surface. A pressure port is disposed between two adjacent spoilers and communicates with the air-flow channel between the spoiler and the housing. The spoiler surface or the surface of the spoiler adopts a shape selected from the group consisting of a concave-convex arc, a triangle, or a trapezoid for extending the path of the air. The spoiler surface is an integral structure and the spoiler is an independent structure. The spoiler surface or the spoiler forms a water wave surface being symmetrical or asymmetrical in a longitudinal direction or being symmetrical or asymmetrical in both the longitudinal direction and a transverse direction, respectively.

Advantages of the invention are summarized as follows:

1. The upper part of the inner portion of the housing is in the shape of the arc so that the air-flow path therein is longer than the air-flow path of the lower part thereof, thereby producing the lifting force; and meanwhile, the air-flow path at the lower part of the outer portion of the housing is longer than that at the upper part thereof, thereby eliminating the lifting force.

The inner portion of the housing is the whole carrying space that suspends within the air-flow channel between in the inner and the outer portions of the housing. The lifting force produced on the inner portion of the housing overcomes or partially overcomes the downward gravity produced by the self-weight of the vehicle, therefore, the vehicle is energy-saving as the downward force on the vehicle is decreased during the travelling and is much safer as the lifting force is eliminated by the outer portion of the housing and the tire-road adhesion is enlarged.

2. The inner portion of the housing produces the lifting force while the outer portion of the housing eliminates the lifting force. These structures that seem to be contradicted are reasonably integrated. The production of the lifting force by the inner portion will not drive the outer portion to produce the lifting force. On the contrary, the inner portion is suspended in the air-flow channel, and the outer portion eliminates the lifting force and increases the tire-road adhesion. Meanwhile, the carrying space of the inner portion decreases the self-weight, so that vehicle is much energy-saving and safe travelling.

BRIEF DESCRIPTION OF THE DRAWINGS

The invention is described hereinbelow with reference to the accompanying drawings, in which.

In the drawings, the following reference numbers are used: 1. Outer portion of housing; 102. Curved upper surface; 103. Flat inner surface; 104. Lateral spoiler; 2. Inner portion of housing; 201. First carrying cabin; 202. Second carrying cabin; 203. Third carrying cabin; 204. Connecting piece; 3. Air-flow channel; 301. Additional air-flow channel; 4. Open air-flow channel; 5. Bottom of housing; 6. Spoiler surface; 601. Spoiler; 602. Concave-convex spoiler surface; 603. Cavity; 7. Elastic device; 701. Magnetic device; 8. First air inlet; 801. Second air inlet; 802. Pressure port; 803. Third air inlet; and 9. Air outlet.

DETAILED DESCRIPTION OF THE EMBODIMENTS

For further illustrating the invention, experiments detailing a vehicle are described below. It should be noted that the following examples are intended to describe and not to limit the invention.

Example 1

Figure 1:
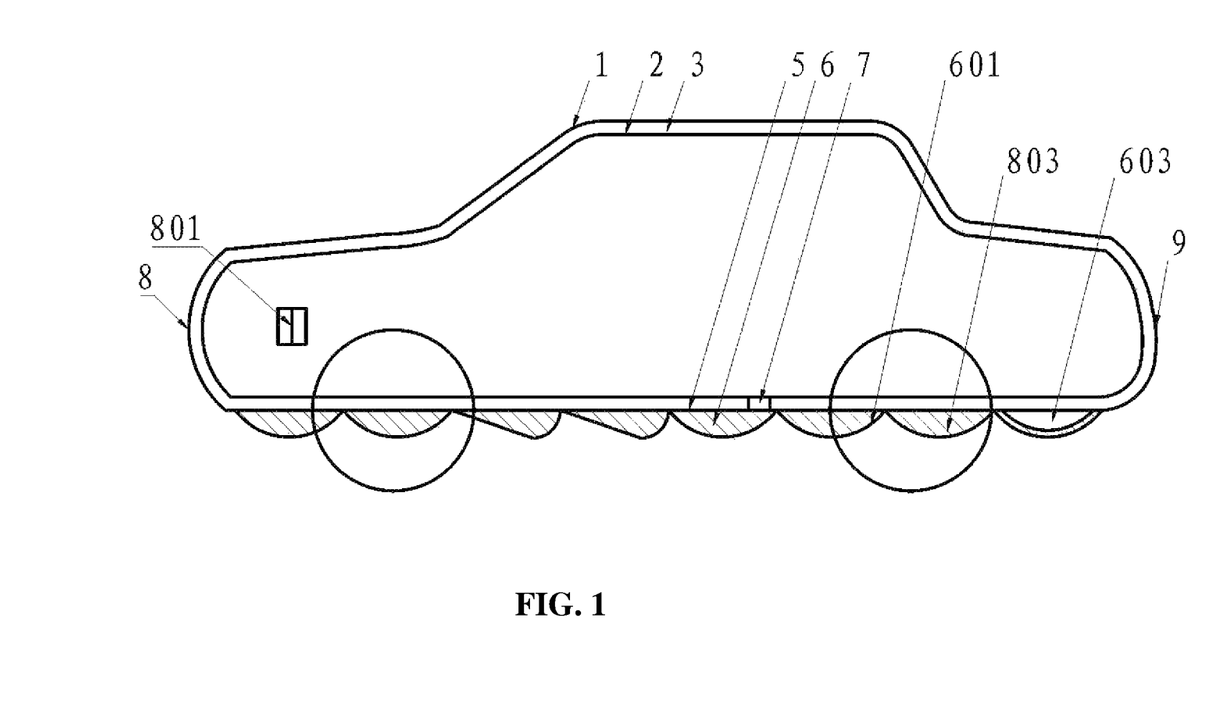
FIG. 1 is a structure diagram of a vehicle in accordance with Example 1.

As shown in FIG. 1, an energy saving vehicle comprises a housing comprising an outer portion 1 and an inner portion 2. An air-flow channel 3 is disposed between the inner portion 2 and the outer portion 1 of the housing. The air-flow channel 3 communicates with an air outlet 9 arranged on a rear of the outer portion of the housing via a first air inlet 8 arranged on a front of the outer portion and a plurality of second air inlets 801 arranged on a periphery of the outer portion of the housing. A plurality of elastic devices 7 connected to one another are arranged between or around a bottom 5 of the housing and the inner portion 2 of the housing for reducing the vibration occurring in the travelling of the vehicle. Particularly, the inner portion of the housing comprises a curved upper surface and a flat lower surface, a lifting force is consequently resulted during the travelling of the vehicle; and the flexible connection of the elastic devices 7 functions in avoiding or attenuating the lifting force to be produced on the bottom of the housing 5 and the outer portion 1 of the housing.

The bottom 5 of the housing 1 comprises an outer surface provided with a spoiler surface 6 for extending a length of a path of the air. The spoiler surface in a longitudinal direction is in a shape of a triangle, a trapezoid, or a concave or convex arc formed by straight lines or arc lines, or in a shape comprising a straight line at a left side and an arc line at a right side, as shown in the left third and the left fourth shape units of the spoiler surface 6 in FIG. 1. One or several combinations of the above shape units can be installed on a bottom of the vehicle to form the spoiler surface to ensure that the length of the path of the air passing through the outer portion of the housing is longer than that passing through the upper part of the outer portion of the housing for the purpose of the reduction of the lifting force.

Preferably, the spoiler surface is concave or convex in longitudinal and transverse directions to form arcs or triangles that are symmetrical or asymmetrical. Particularly, the asymmetry in the longitudinal and the transverse directions well simulates a water wave surface in the nature which is the best embodiment to use the spoiler surface to prolong the path of the air. The size of concave or convex area on the windward side of the spoiler surface is determined by the distance between the bottom of the vehicle and the surface of the road, and the lifting force is reduced by the spoiler surface according to different types of vehicles.

When the vehicle travels, the air enters the air-flow channel 3 via the first air inlet 8 arranged on the front of the outer portion of the housing. Under the same condition, the velocity of the airing inside the air-flow channel is higher than the velocity of the air flowing outside the air-flow channel, so that the velocity of the air inside the air-flow channel is increased because of the inner pressure by a front air in the front part and the lateral air in the lateral part. Meanwhile, the air surrounding the lateral side of the outer portion of the housing applies an inward pressure on the surface of the vehicle, which facilitates the entering of the air to the air-flow channel via the second air inlets 801. The air passes through the air-flow channel at a high velocity and surrounds the inner portion 2 of the housing. Because the length of the air passing through the arc-shaped upper part of the inner portion 2 of the housing is longer than that passing through the flat lower part of the inner portion 2, a lifting force is resulted. The faster the vehicle runs, the larger the lifting force is produced on the inner portion 2, the more the downward self-weight is overcome, thereby being more energy-saving during the travelling of the vehicle.

As the lifting force is produced in the inner portion 2 of the housing and the connection between the inner portion 2 and the outer portion 1 of the housing via the elastic device 7 is flexible, the lifting force supposed to be produced on the bottom of the outer portion 1 of the housing 5 is at least partially prevented or eliminated.

The air-flow channel 3 surrounds the inner portion 2 of the housing, the air therein fast passes through, a lifting force is then produced, and at least a partial weight of the inner portion 2 of the housing is suspended inside the air-flow channel 3. The lifting force overcomes the self-weight of the inner portion 2 of the housing, as the weight of the inner portion 2 is decreased, the energy consumption during the vehicle travelling decreased. The faster the vehicle travels, the larger the lifting force is produced on the inner portion of the housing, the more the self-weight is overcome, and the more energy is saved.

The bottom of the outer portion 1 of the housing is connected to the wheel via a shaft. The path of the air passing through the bottom of the outer portion 1 of the housing is longer than that through the upper part due to the arrangement of the spoiler surface; the lifting force produced during the vehicle travelling is totally eliminated. The velocity of the air increases when the air passes through the spoiler surface on the bottom of the vehicle, thus, the tire-road adhesion of the vehicle is uniformly increased. Once the wheel rotates for a circle, the vehicle correspondingly runs for a distance equal to the circumference of the wheel, so that the energy loss produced in empty rotation occurs in each revolution due to the lifting force is prevented, thereby realizing the energy saving purpose.

The air inside the air-flow channel 3 flows faster than that outside the air-flow channel 3, so that a large amount of air discharged out of the vehicle via the air outlet 9 arranged on the rear part has a higher velocity than the air surrounding the vehicle. Because of the continuity of the air, the surrounding air simultaneously reaching the rear part of the vehicle will not surround the air discharged from the air outlet 9 at a high velocity. Thus, a negative region at the rear part of the vehicle is filled and is transformed to be a relative positive region. The first air inlet 8 of the front outer portion of the housing and the second air inlets 801 of the lateral outer portion of the housing allow the windward side to be the relative negative region and allow the leeward side to be the relative positive region; the air resistance is largely reduced. Therefore, the air distribution is partially changed, which further saves the energy. The relative negative region is in relation to the positive region at the windward side, and the relative positive region is in relation to the negative region at the leeward side.

Because the inner portion of the housing is the main carrying space and the outer portion of the housing has a light weight; the inner portion produces the lifting force to decrease the self-weight while the outer portion totally eliminates the lifting force produced during the travelling of the vehicle and changes the distribution of the air, so that the air resistances at the negative region in the front and lateral side of the vehicle are reduced, which forms the principle of the energy-saving vehicle.

As an improvement, the spoiler surface 6 arranged on the bottom of the vehicle comprises a cavity 603 and a windward side comprising a plurality of third air inlets 803; and the third air inlets 803 communicate with the cavity 603. Because that the path of the air passing through the cavity 603 is longer than that through the corresponding windward side and that the air flow in the cavity is discontinuous and the velocity of the air flowing inside the cavity is different from that outside the windward side of the spoiler surface 6; a pressure difference transfer is produced from inner side to outer side, and consequently, the pressure and friction on the windward side of the spoiler surface 6 are reduced, and the air resistance is decreased.

As an improvement of the invention, the spoiler 601 formed by a plurality of independent windward sides being in a shape of the arc, the triangle, or the trapezoid, is arranged at a total or a partial the bottom of the vehicle along the length thereof; and accordingly, the spoiler surfaces 6 can be arranged on a total or a partial bottom of the vehicle. The spoiler surface 6 is a relatively integral spoiler device, whereas the spoiler 601 is an independent spoiler device. It is convenient to improve the vehicle by adopting such arrangement of the independent spoilers.

The invention has overcome the following problems: 1. The lifting force produced in the inner portion of the housing overcomes a partial gravity; whereas the inner portion is the main carrying space, so that the lifting force is capable of decreasing the gravity and saving the energy. 2. The outer portion of the housing produces a pressure difference from top to bottom to eliminate the lifting force, so that the running of the vehicle is much stable and safe; and meanwhile, with the increase of the tire-road adhesion, the wheel rotate for one circle and the vehicle runs for a corresponding distance, thereby being energy-saving. 3. The air distribution state is totally or partially changed during the travelling of the vehicle, the windward side becomes the relative negative pressure region, and the leeward side becomes the relative positive pressure region, so that the vehicle saves energy.

Example 2

Figure 2:
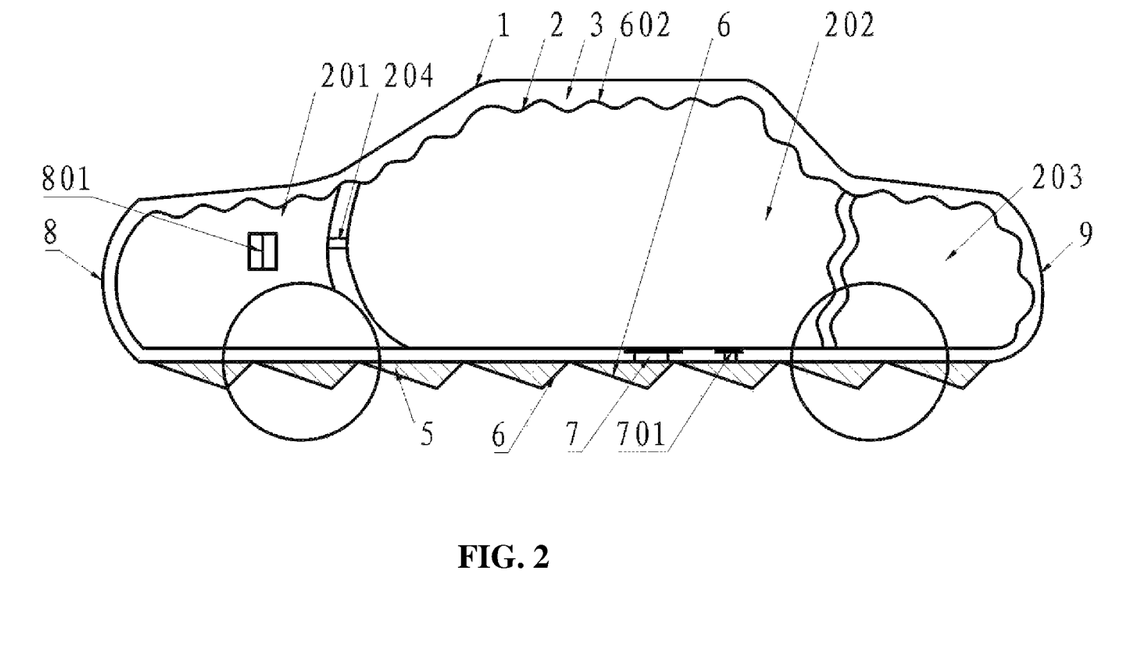
FIG. 2 is a structure diagram of a vehicle in accordance with Example 2.

As shown in FIG. 2, the vehicle is the same as that in Example 1 except that the air-flow channel 3 communicating with the atmosphere via the first and the second air inlets 8, 801 divides the inner portion 2 of the housing into a first carrying cabin 201, a second carrying cabin 202, and a third carrying cabin 203. The carrying cabins are connected to one another via connecting pieces 204. When the vehicle travels, the air-flow channel 3 surrounds each carrying cabin, as each of the carrying cabins has a curved upper surface and a flat lower surface, the path of the air passing through the curved upper surface is different from that through the lower surface, resulting in a pressure difference and further producing a lifting force on each carrying cabin, and thus, a larger lifting force is produced under an overall action of the three carrying cabins 201, 202, and 203. The spoiler surface 6 can also be formed by a plurality of triangles.

The upper surface of each of the carrying cabins is provided with a plurality of concave-convex spoiler surfaces 602 for prolonging the path of the air passing through and for producing a much larger pressure difference and lifting force between the convex and concave upper surface and the flat lower surface of each carrying cabin.

When each lateral side of the carrying cabin adopts a concave-convex spoiler surface 602 or a curved spoiler surface, the path of the air passing through the lateral side together with the path of the air passing through the curved upper surface of each cabin are much longer than that through the lower flat surface of the cabin, so that a much larger pressure difference and a lifting force is resulted.

Since the length of the path of the air passing through the curved upper surface is longer than that through the bottom 5 of the housing and the arrangement of the concave-convex spoiler surface 602 further extending the path of the air, the path of the air passing through the upper part of the vehicle is far larger than that through the spoiler surface 6 of the bottom of the vehicle. The path of the air through the second air inlets and the air-flow channel 3 is different from the spoiler surface 6 of the bottom of each carrying cabin, so that a pressure difference and lifting force are produced. A combination of each carrying cabins produces a much larger lifting force on the inner portion 2 to overcome the self-weight of the inner portion and to save more energy.

A magnetic device 701 is arranged on a contact surface that connects the elastic device 7 and the inner portion of the housing. The magnetic device comprises magnetic materials of opposite polarities. Based on the principle that opposite polarities of magnet repel, and like poles of magnet attract; when the magnetic materials of opposite polarities produce the lifting force in the inner portion 2 of the housing, the magnetic materials of the same poles strengthen the lifting force. The magnetic device 701 is permanent magnetic material or is capable of producing electromagnetic field after being energized.

Example 3

Figure 3:
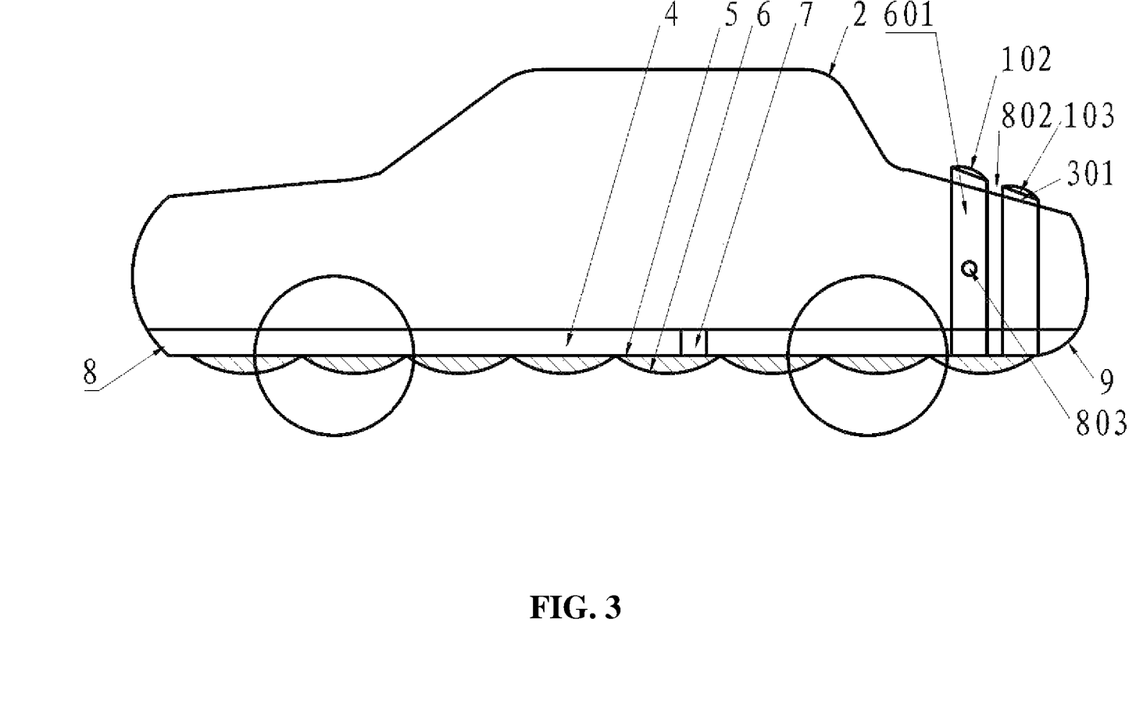
FIG. 3 is a structure diagram of a vehicle in accordance with Example 3.

As shown in FIG. 3, the vehicle is the same as that in Example 2 except that the outer portion 1 of the housing of the vehicle comprises a plurality of independent spoilers 601 arranged on surfaces of the upper and the lateral of the vehicle according to the profile of the vehicle. A lower part of the spoiler 601 is connected to the bottom 5 of the housing. An open air-flow channel 4 is formed between the inner portion 2 and the bottom 5 of the housing, and the open air-flow channel 4 communicates with the first air inlet 8 and the air outlet 9. The spoiler comprises a curved upper surface 102 and a flat inner surface 103. An additional air-flow channel 301 is formed between the flat inner surfaces 103 of the spoiler and the inner portion 2 of the housing. Pressure ports are formed between two adjacent spoilers and enable the additional air-flow channel 301 to communicate with the atmosphere.

In travelling of the vehicle, the air flows into the open air-flow channel 4 via the first air inlet 8 and out via the air outlet 9, during which, a lifting force is produced due to the air path difference between the upper and lower surface the inner portion 2. The air passes through the spoiler 601, as the length of the path of the air passing through the curved outer surface 102 is longer than that through the flat inner surface 103, a pressure difference occurs between the outer surface and the inner surface of the spoiler 601 due to a velocity difference. A pressure difference is transferred from the air of low velocity and high pressure passing through the additional air-flow channel 301 to the air of high velocity and low pressure passing through the curved upper surface 102, a pressure difference is transferred from the inner side to the outer side of each spoiler, thereby forming a pressure difference transferring region around the upper and the lateral of the vehicle. Thus, pressures applied on the curved upper surface 102 and flat inner surface 103 of the spoiler and the additional air-flow channel 301 are reduced, the friction produced by the air and the air resistance are correspondingly reduced. The spoilers 601 are arranged on the partial or whole outer portion 1 of the housing of the vehicle.

The spoiler 601 further comprises a cavity 603. The curved upper surface 102 of the spoiler 601 is provided with a plurality of third air inlets 803 for enabling the cavity 603 to communicate with the atmosphere. When the air passes through the spoiler 601, the air through the cavity 603 has a lower velocity than that through the curved outer surface 102, therefore, a pressure difference transfer occurs from the inner side to the outer side of the spoiler via the third air inlet 803, and the air resistance applied on the outer surface of the spoiler is further reduced.

The spoilers 601 are arranged transversely or longitudinally on the outer surface of the vehicle. For example, spoilers 601 are longitudinally arranged on the lower part of the vehicle and transversely arranged on the upper part; or spoilers 601 are transversely arranged on the lower part of the vehicle and longitudinally arranged on the upper part; or a group of spoilers are transversely arranged and surrounded by spoilers that are longitudinally arranged, and such combination are distributed from the front to the rear of the vehicle.

Or, the spoiler surface 6 on the bottom of the vehicle is removed, and a spoiler surface 601 in a circular structure is arranged around the inner portion 2 and the bottom 5 of the housing.

The flat inner surface 103 of each spoiler is connected to the bottom 5 of the housing; or the additional air-flow channel 301 is formed between the flat inner surface 103 of the spoiler and the bottom 5 of the housing.

The curvature of the curved upper surface 102 at the bottom of the vehicle is larger than the curvature of the upper of the vehicle, so that the length of the path of the air passing through the bottom of the vehicle is longer than that through the upper part of the vehicle, the lifting force produced in the travelling of the vehicle is consequently eliminated. The inner portion 2 of the housing produces the lifting force and overcomes at least partial downward gravity, while the arrangement of the spoilers 601 around the vehicle forms the pressure transfer circle to reduce the air resistance.

A plurality of the spoilers 601 cover a part or the whole vehicle.

A plurality of the spoilers 601 partially cover the outer of the vehicle, and the area not covered by the spoilers 601 is arranged by the outer portion of the housing, thus, a combination of the spoilers 601 and the outer portion of the housing form the outer structure of the vehicle.

Example 4

Figure 4:
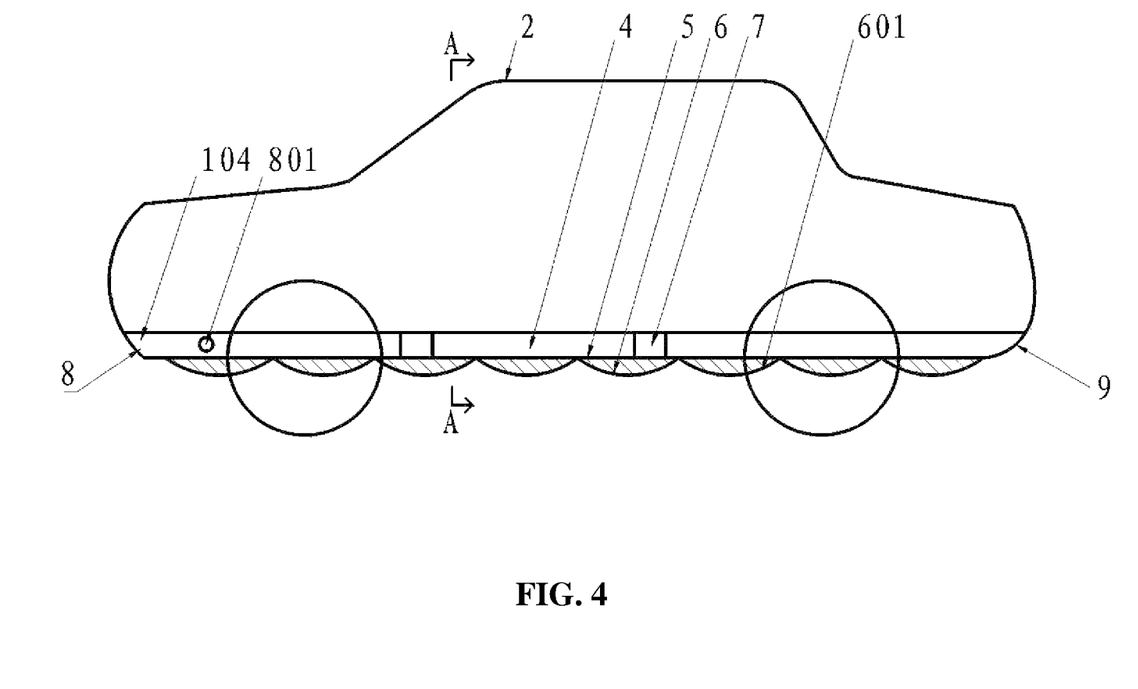
FIG. 4 is a structure diagram of a vehicle in accordance with Example 4.
Figure 5:
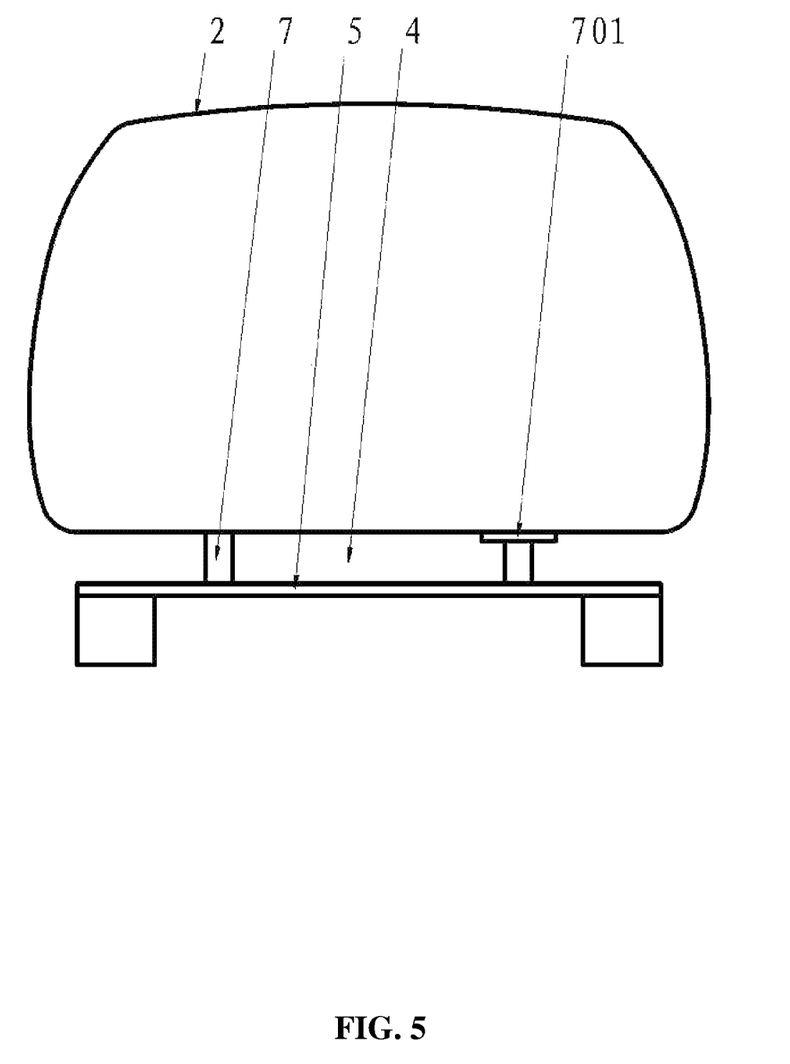
FIG. 5 is a cross-sectional view taken from line A-A in FIG. 4.

As shown in FIGS. 4-5, the vehicle is the same as that in Example 3 in that the housing of the vehicle comprises an upper part and a lower part. The upper part is the inner portion 2, and the lower part is the bottom 5 of the housing. The open air-flow channel 4 is disposed between the inner portion 2 of the housing and the bottom 5 of the housing, and the inner portion 2 and the bottom 5 of the housing are connected via a plurality of elastic devices 7.

During the travelling of the vehicle, although the length of the path of the air passing through the upper surface of the inner portion 2 of the housing is larger than that through the lower surface thereof, the two branches of air flow simultaneously reach the rear part of the vehicle because the continuity of the air flow, and thus, the consequent lifting force overcomes at least a part of the gravity of the inner portion 2 of the housing. By arranging the spoiler surface 6 on the lower surface of the bottom 5 of the housing, the path of the air passing through the spoiler surface 6 is longer or equal to the path of the air passing through the upper surface of the inner portion 2 of the housing, therefore, the lifting force produced during the travelling of the vehicle is largely eliminated or decreased, the tire-road adhesion is improved, and the stability of the travelling of the vehicle is improved.

To decrease the lifting force produced on the left and the right sides of the vehicle, the left side and the right side of the open air-flow channel 4 are provided with lateral spoilers 104 along a length direction. The lateral spoilers are concave or convex in relation to the inner portion 2 and the bottom 5 of the housing. A longitudinal direction of the outer surface of each lateral spoiler 104 is concave-convex arc, triangle, or trapezoid for allowing the path of the air passing through the outer surface of the lateral spoiler 104 is longer than that through the upper surface of the inner portion 2 of the housing. Furthermore, the lateral spoiler 104 is provided with a plurality of the second air inlets 801 for communicating with the open air-flow channel 4, thus, pressure differences from the upper to the lower are produced on two lateral sides when the vehicle travels, and the lifting force is further eliminated.

Example 5

Figure 6:
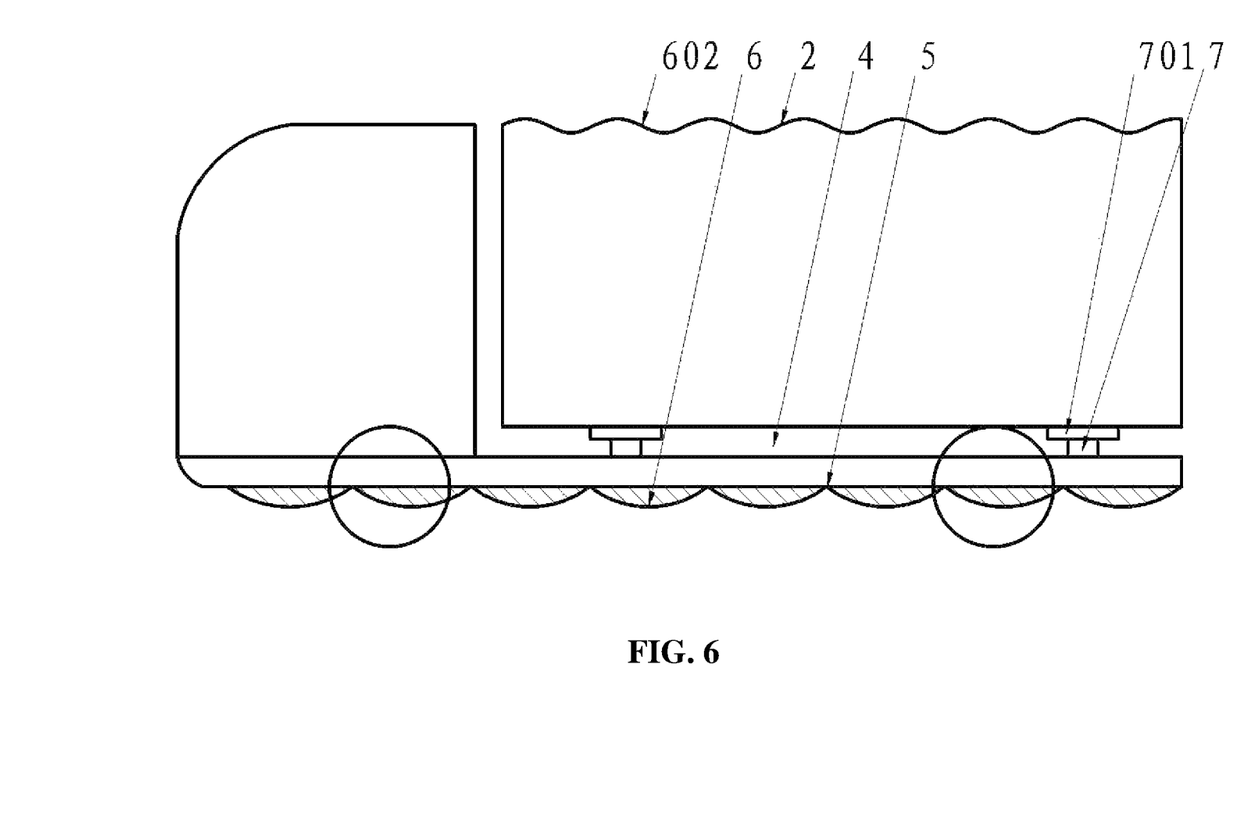
FIG. 6 is a structure diagram of a vehicle in accordance with Example 5.

The conception of the vehicle can be applied in a bus, van, larger size freight car, and container truck. As shown in FIG. 6. A periphery of the open air-flow channel 4 is an open structure, but is different from that in Example 4 in that the first air inlet 8 and the air outlet 9 are deleted herein.

The inner portion of the housing is the carrying cabin, and the surface of the upper part thereof utilizes the concave-convex spoiler surface 602 to allow the path of the air passing through the surface of the upper part to be longer than that through the surface of the lower part, thereby producing the lifting force. The path of the air passing through the concave-convex spoiler surface 602 arranged on the lower surface of the bottom 5 of the housing is slightly longer than that through the concave-convex spoiler surface 602 arranged on the surface of the upper part of the vehicle, the lifting force during the travelling is eliminated. It is very convenient and simple to utilize the above structure to improve the property of energy-saving of the container trucks.

The lifting force produced by the inner portion 2 of the housing at least partially overcomes by the gravity. The length of the path of the air passing through the spoiler 6 on the lower part of the bottom 5 of the housing is no less than that through the concave-convex spoiler surface 602 of the upper part of the inner portion, thereby reducing the lifting force. Besides, technical solutions including the division of the inner portion of the housing into a plurality of carrying cabins and the arrangement of the spoilers surrounding the vehicle are employed to reduce the air resistance. The stability during the travelling of the vehicle is very important to those large size vehicles, and the invention is capable of improving the safety of the large size vehicle, decreasing the occurrence of rollover of the vehicle when cornering at a high velocity.

Example 6

As shown in FIGS. 4-6, the housing of the vehicle is an integrated structure. The spoiler surface 601 or a surface of the spoiler 6 adopts a shape selected from the group consisting of a concave-convex arc, a triangle, or a trapezoid.

As an improvement, the spoiler surface is disposed at the first half of the bottom of the housing, and a plurality of spoilers are disposed at the rear of the housing, or the spoiler surface is disposed in the middle of the housing.

As an improvement, the spoiler or the spoiler surface further comprises a cavity 603. The curved upper surface 102 of the spoiler 601 is provided with a plurality of third air inlets 803 for enabling the cavity 603 to communicate with the atmosphere. When the air passes through the spoiler 601, the air through the cavity 603 has a lower velocity than that through the curved outer surface 102, therefore, a pressure difference transfer occurs from the inner side to the outer side of the spoiler via the third air inlet 803, and the air resistance applied on the outer surface of the spoiler is further reduced (as shown in FIG. 1).

As an improvement, as shown in FIG. 3, the outer portion of the housing comprises a plurality of spoilers comprising a curved outer surface 102 and a flat inner surface 103, and the spoilers cover a partial or the whole inner portion of the housing; a pressure port is formed between two adjacent spoilers; and the pressure port communicates with the air-flow channel disposed between the spoilers and the inner portion of the housing.

In summary, the vehicle of the invention has the following advantages:

1. The upper part of the inner portion of the housing is in a shape of the arc so that the air-flow path therein is longer than the air-flow path on the lower part, thereby producing the lifting force; and meanwhile, the air-flow path at the lower part of the outer portion of the housing is longer than the upper part, thereby eliminating the lifting force. The inner portion of the housing is the whole carrying space that suspends within the air-flow channel between in the inner and the outer portions of the housing. The lifting force produced on the inner portion of the housing overcomes or partially overcomes the downward gravity produced by the self-weight of the vehicle, therefore, the vehicle is energy-saving as the downward force on the vehicle is decreased during the travelling and is much safer as the lifting force is eliminated by the outer portion of the housing and the tire-road adhesion is enlarged.

2. The inner portion of the housing produces the lifting force while the outer portion of the housing eliminates the lifting force. These structures that seem to be contradicted are reasonably integrated. The production of the lifting force by the inner portion will not drive the outer portion to produce the lifting force. On the contrary, the inner portion is suspended in the air-flow channel, and the outer portion eliminates the lifting force and increases the tire-road adhesion. Meanwhile, the carrying space of the inner portion decreases the self-weight, so that vehicle is much energy-saving and safe travelling.

3. The inner portion of the housing of the vehicle is divided into a plurality of the carrying cabins, the air-flow channel surrounds each of the carrying cabins to facilitate the production of the lifting force on each carrying cabin and allow the inner portion of the housing to produce a much larger lifting force to overcome the gravity.

4. The spoiler substitutes the outer portion of the housing and surrounds the partial or the whole vehicle for producing the pressure difference transferring region and decreasing the air resistance.

While particular embodiments of the invention have been shown and described, it will be obvious to those skilled in the art that changes and modifications may be made without departing from the invention in its broader aspects, and therefore, the aim in the appended claims is to cover all such changes and modifications as fall within the true spirit and scope of the invention.

The invention claimed is:

1. A vehicle adapted to travel over ground, the vehicle comprising a housing, the housing comprising:
   an outer housing, the outer housing comprising a first top part, a first bottom part, and a first lateral part; the first top part having a first top surface; the first bottom part having a first bottom surface; and the first lateral part having a front portion and a rear portion;
   an inner housing, the inner housing comprising a second top part, a second bottom part, and a second lateral part; the second top part having a second top surface; and the second bottom part having a second bottom surface;
   a first air-flow channel;
   a plurality of air inlets;
   an air outlet;
   a plurality of spoiler surfaces; and
   a plurality of elastic devices;
   wherein:
   the outer housing encloses the inner housing;
   the outer housing and the inner housing are connected to each other via the elastic devices;

a weight of the inner housing is larger than a weight of the outer housing;

the first air-flow channel is disposed between the outer housing and the inner housing;

the first bottom part is disposed above the ground and the first top part is disposed above the first bottom part;

the second bottom part is disposed above the ground and the second top part is disposed above the second bottom part;

the first lateral part extends from the first bottom part to the first top part;

the second lateral part extends from the second bottom part to the second top part;

the air inlets are disposed at the front portion, and the air outlet is disposed at the rear portion;

the first air-flow channel is connected to the air inlets and the air outlet;

the first top surface is in an arc shape;

the first bottom surface is flat;

the spoiler surfaces are disposed on the first bottom surface;

a length of the path for air passing through the first bottom surface and the spoiler surfaces is longer than a length of the path for air passing through the first top surface, whereby eliminating a lifting force acted on the outer housing during movement of the vehicle;

the second top surface is in an arc shape;

the second bottom surface is flat; and a length of the path for air passing through the second top surface is longer than a length of the path for air passing through the second bottom surface, whereby resulting in a lifting force acted on the inner housing during the movement of the vehicle.

2. The vehicle of claim 1, further comprising a plurality of magnetic devices having opposite polarities, wherein the magnetic devices are disposed on the contact surface between the elastic devices and the inner housing, or disposed between the inner housing and the outer housing.

3. The vehicle of claim 1, wherein the spoiler surface adopts a shape selected from the group consisting of a concave-convex arc, a triangle, or a trapezoid for extending the path of the air, and the spoiler surface is an integral structure.

4. The vehicle of claim 1, wherein the spoiler surfaces form a water wave surface being symmetrical or asymmetrical in a longitudinal direction or being symmetrical or asymmetrical in both the longitudinal direction and a transverse direction.

5. The vehicle of claim 1, wherein the inner housing comprises a plurality of independent carrying spaces.

6. The vehicle of claim 1, wherein:

the outer housing further comprises a plurality of spoilers comprising a curved outer surface and a flat inner surface, and the spoilers cover a partial or the whole inner housing;

a second air-flow channel is disposed between the spoilers and the inner housing;

a pressure port is formed between two adjacent spoilers; and the pressure port is connected to the second air-flow channel.

7. The vehicle of claim 6, wherein the spoiler is in a circular structure.

8. The vehicle of claim 1, wherein:

the spoiler surface comprises a cavity;

a plurality of pressure ports are arranged on an outer surface of the spoiler surface; and the pressure ports are connected to the cavity.

9. A vehicle adapted to travel over ground, the vehicle comprising:

a housing, the housing comprising an upper portion, a lower portion, a first air-flow channel, and a plurality of elastic devices;

wherein:

the lower portion is disposed above the ground and the upper portion is disposed above the lower portion;

the upper portion and the lower portion are connected to each other via the elastic devices;

the first air-flow channel is disposed between the upper portion and the lower portion and the air-flow channel is connected to the atmosphere; and a plurality of first spoiler surfaces is disposed on a bottom surface of the lower portion and a plurality of second spoiler surfaces is disposed on a top surface of the upper portion; and a length of the path for air passing through the first spoiler surfaces and the bottom surface is no less than a length of the path for air passing through the second spoiler surfaces and the top surface, whereby resulting in a lifting force acted on the upper portion and eliminating a lifting force acted on the lower portion during the movement of the vehicle.

10. The vehicle of claim 9, wherein magnetic devices having opposite polarities are disposed on a contact surface between the elastic devices and the upper portion and a contact surface between the elastic devices and the lower portion, or disposed between the upper portion and the lower portion.

11. The vehicle of claim 9, wherein:

the housing further comprises a plurality of spoilers each comprising a curved outer surface and a flat inner surface;

a second air-flow channel is disposed between the spoilers and the housing; and a pressure port is disposed between two adjacent spoilers and is connected to the second air-flow channel.

12. The vehicle of claim 11, wherein the first or second spoiler surface or a surface of the spoiler adopts a shape selected from the group consisting of a concave-convex arc, a triangle, or a trapezoid for extending the path of the air; and the first or second spoiler surface is an integral structure and the spoiler is an independent structure.

13. The vehicle of claim 11, wherein the first or second spoiler surfaces or the spoilers form a water wave surface being symmetrical or asymmetrical in a longitudinal direction or being symmetrical or asymmetrical in both the longitudinal direction and a transverse direction.

14. The vehicle of claim 1, wherein the second top surface further comprises a plurality of second spoiler surfaces or a plurality of second spoilers, for extending the path for air passing through the second top surface, thereby increasing the lifting force acted on the inner housing during the movement of the vehicle.

* * * * *